United States Patent
Futamura

(10) Patent No.: US 9,619,585 B2
(45) Date of Patent: Apr. 11, 2017

(54) FAST, SCALABLE DICTIONARY CONSTRUCTION AND MAINTENANCE

(71) Applicant: InfiniteBio, San Jose, CA (US)

(72) Inventor: Natsuhiko Futamura, San Jose, CA (US)

(73) Assignee: InfiniteBio, Sunnyvale, CA (US)

( * ) Notice: Subject to any disclaimer, the term of this patent is extended or adjusted under 35 U.S.C. 154(b) by 284 days.

(21) Appl. No.: 14/301,179

(22) Filed: Jun. 10, 2014

(65) Prior Publication Data

US 2014/0365500 A1    Dec. 11, 2014

Related U.S. Application Data

(60) Provisional application No. 61/842,350, filed on Jul. 2, 2013, provisional application No. 61/833,903, filed on Jun. 11, 2013.

(51) Int. Cl.
*G06F 17/30* (2006.01)

(52) U.S. Cl.
CPC .. *G06F 17/30985* (2013.01); *G06F 17/30961* (2013.01)

(58) Field of Classification Search
USPC ........................................ 707/705, 743, 797
See application file for complete search history.

(56) References Cited

U.S. PATENT DOCUMENTS

2004/0236720 A1    11/2004    Basso et al.

OTHER PUBLICATIONS

Rama Sangireddy et al, Scalable, Memory Efficient, High-speed IP lookup Algorithms, 2005.*
International Search Report and Written Opinion in International Application No. PCT/US2014/041784, mailing date Nov. 6, 2014, 6 pages.
Rama Sangireddy et al., Scalable, Memory Efficient, High-Speed IP Lookup Algorithms. EEE/ACM Transactions on Networking, vol. 13, .N2 4. Aug. 2005 [online][retrieved on Nov. 5, 2014]. Retrieved from the Internet: <URL: http://www3.ee.iastate.edu/dcni/Publications/docs/Comp-Arch/DCNL-CA-2005-702.pdf.>, abstract, part IV.

* cited by examiner

*Primary Examiner* — Hung T Vy
(74) *Attorney, Agent, or Firm* — Perkins Coie LLP

(57) ABSTRACT

A computer-implemented method of constructing and maintaining a record keeping dictionary data structure can include: generating a PATRICIA trie from a set of strings; generating multiple kth-level elevator-stairs data structures at exponentially reducing k-levels, wherein each of the kth-level elevator-stairs data structure includes a kth-level trie corresponding to the PATRICIA trie and wherein nodes of the kth-level trie at string depths of integer multiples of k are accessible through hash table links; and linking nodes in neighboring kth-level tries of the multiple kth-level elevator-stairs data structures where the nodes represent a same node in the PATRICIA trie.

22 Claims, 13 Drawing Sheets

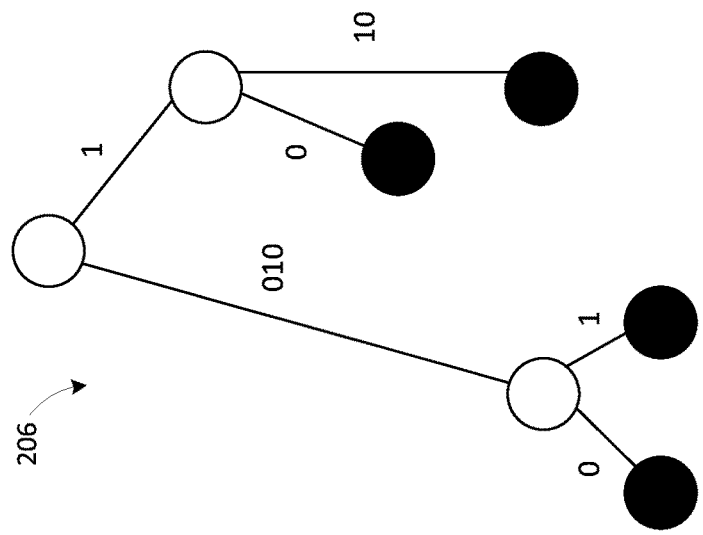
*FIG. 2C*
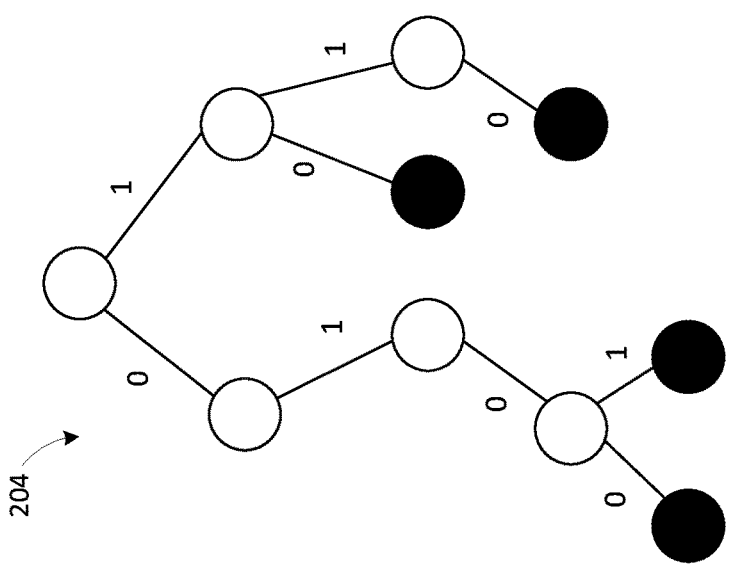
*FIG. 2B*
10
110
0100
0101
*FIG. 2A*

```
procedure Build k^th-level-tree (v)
kv=Create a k^th-level-tree node that corresponds to v
Create an empty hash table H(v) in kv
If v is a leaf return (kv)
for each edge that crosses level k from v
    Add a non-branching node at level k
for each node u at level k
    path = path label between v and u
    p = Build -level-tree (u)
    Insert p into H(v) wih key = path
return (kv)
                                            300
``` procedure Build fast

Make $k$-level trees with $k = W, \ldots 2$
    Link nodes that represent same PATRICIA trie node

400

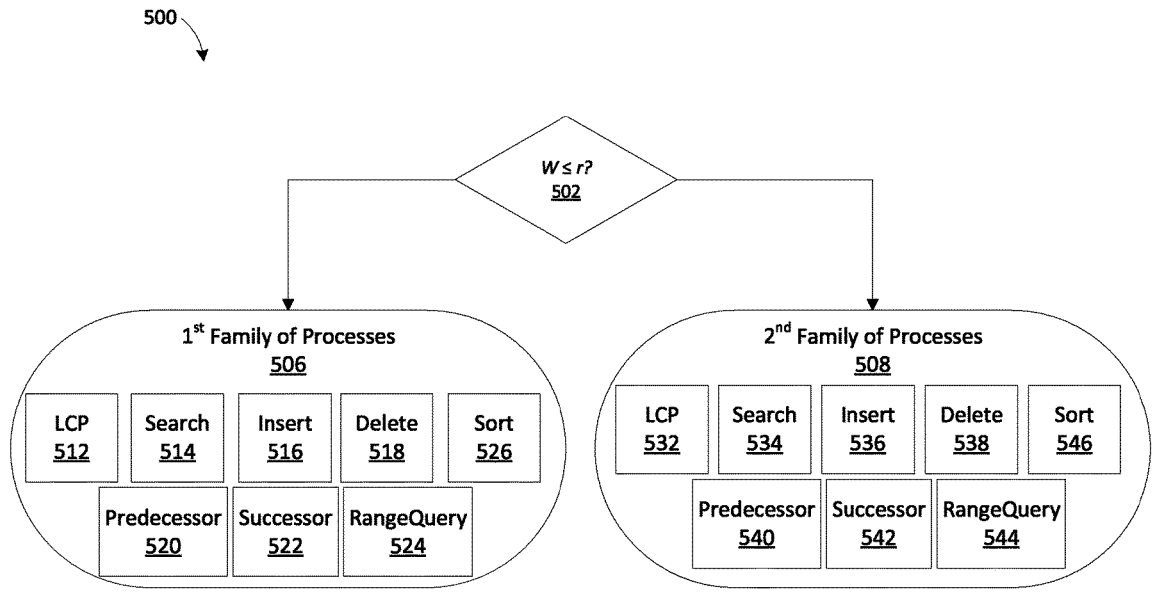

FIG. 5

```
Computing LCP(x,Ds) using logW-elevators method
Procedure logWE_LCP(node, p, pos, L)
  if L = 1
    if (node in PATRICIA trie has an edge to a
       child node with edge label starting with p[pos+1])
       return(pos+1)
    else
       return(pos)
  else
    key = p[ pos ... pos+L-1]
    Look up hashtable at node with key
    if the key is found in the hash table stored at the node
       v = node in L/2th l-evel-tree corresponding to key in hash table stored at the node
       logWE_LCP(v, p, pos+L, L/2)
    else
       v = node in L/2th level tree corresponding to node
       logWE_LCP(v,p, pos, L/2))
                                                                            602
```

FIG. 6A

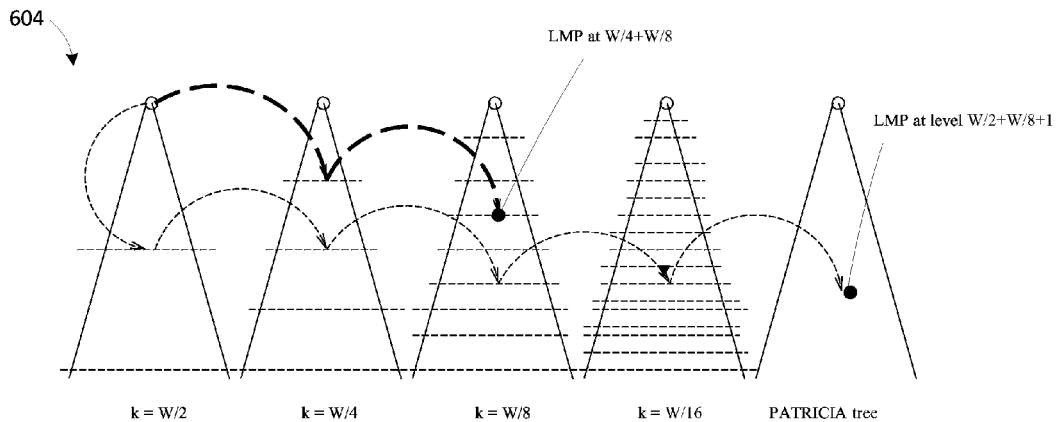

*FIG. 6B*

```
procedure LogWE_Insert(x, Ds)
    perform LCP(x, Ds)
    pnode = node where search ends in PATRICIA trie of Ds
    Attach a leaf for x at pnode
    edge=the edge between the pnode and the leaf for x
    Insert edge for all k^th-level-trees
                                                          606
```

*FIG. 6C*

```
Delete(x,Ds) using logW-elevators method
    procedure LogWE_Insert(x,Ds)
        perform LCP(x,Ds)
        pnode = leaf matching x in PATRICIA trie of Ds
        edge=the edge that connect pnode to its parent
        Delete pnode from the PATRICIA trie
        Delete edge for all k^th-level-trees
                                                          608
```

*FIG. 6D*

Procedure RangeQuery(x, y, Ds)
[STEP 1]: Find the lowest common ancestor of Successor(x,Ds) and Predecessor(y,Ds) in the PATRICIA trie
(the lowest common ancestor operation is denote as lca(Successor(x,Ds), Predecessor(y,Ds))

[STEP 2]: output(Successor(x,Ds))

[STEP 3]: For each node u on the path starting from Successor(x,Ds) to the left child of lca(Successor(x,Ds), Predecessor(y,Ds))
  [STEP 3.1]: If node u has a right child node v
    Do the depth first traversal of the entire subtree rooted by node v and output all the leaf nodes in the subtree End for

[STEP 4]: For each node u on the path starting from left child of lca(Successor(x,Ds), Predecessor(y,Ds)) to Successor(x,Ds)
[STEP 4.1]: If node u has a left child node v
    Do the depth first traversal of the entire subtree rooted by v and output all the leaf nodes in the subtree End for                                                                                            610
[STEP 5]: output(Predecessor(y,Ds))

*FIG. 6E*

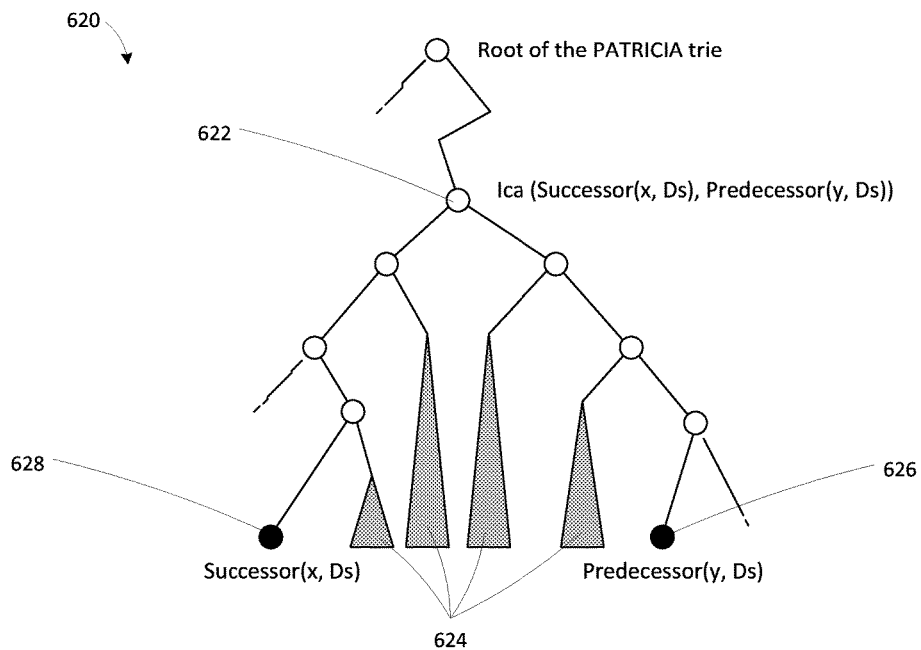

*FIG. 6F*

```
LCP(x,Ds) using hybrid method
Procedure LCP_Hybrid(knode,x,pos)
   if node represents a leaf in PATRICIA trie of Ds
      return(pos)
   key = p[pos +1...pos+ k]
   if key is in H(node)
      v = node corresponding to key in the hash table of knode
      return(LCP_Hybrid(v,x,pos + k))
   else
      logWE_node= node in logWE tree that corresponds to knode
      return(LogWE_LCP(logWE_node, x, pos, r))
```

```
Insert(x,Ds) using hybrid method
Procedure Insert_Hybrid(x, Ds)
   Search string x in the same way as LCP(x, Ds)
   Create a node in the PATRICIA trie at place that LCP(x, Ds) algorithm finished
   xnode = node where the search ends
   Attach a leaf for x at xnode
   e = the new edge between x and pnode
   [Update r^th-level-tree]
   if e crosses a -level
      Create a node at the r^th-level on e
      parent = xnode's parent in r^th-level-tree (LCP(x, Ds) has gone through this node)
      rnode = node in -level-tree to represent xnode
      Insert a pointer to rnode in H(parent)
   [Update LogWE trees]
   Insert e on -level-trees used in logWE_LCP search (Insertion happens at the node of r^th-level-trees
where the LCP(x, Ds) has gone through)
```

```
Delete(x,) using hybrid method
Procedure Delete_Hybrid(x, Ds)
    Search string x in the same way as LCP(x, Ds)
    Create a node in the PATRICIA trie at place that LCP(x, Ds) algorithm finished
    xnode = node where the search ends in PATRICIA trie
    if xnode is not a leaf of PATRICIA trie
        return("error")
    [Update PATRICIA trie]
    Delete xnode and the edge coming into the xnode
    e = between xnode and the rest of the tree
    [Update $r^{th}$-level-tree]
    if e crosses a $r^{th}$-level
        Delete a node at the $r^{th}$-level on e
        parent = xnode's parent in $r^{th}$-level-tree (LCP(x, Ds) has gone through this node)
        rnode = node in -level-tree to represent xnode
        Delete a pointer to rnode in H(parent)
    [Update LogWR trees]
    Delete e on -level-trees used in logWE_LCP search (Deletion happens at the node of $r^{th}$-level-trees where the
LCP(x, Ds) has gone through)                                                                                    716
```

*FIG. 7E*

FAST, SCALABLE DICTIONARY CONSTRUCTION AND MAINTENANCE

CROSS-REFERENCE TO RELATED APPLICATION(S)

This application claims the benefit of U.S. Provisional Patent Application No. 61/833,903, entitled "METHODS AND SYSTEMS OF FAST STRING SEARCH," which was filed on Jun. 11, 2013, and the U.S. Provisional Patent Application No. 61/842,350, entitled "METHODS AND SYSTEMS OF FAST STRING SEARCH," which was filed on Jul. 2, 2013, both of which are incorporated by reference herein in their entirety.

RELATED FIELD

This disclosure relates generally to a data index system, and in particular to constructing and maintaining a dictionary data structure.

BACKGROUND

Fast dictionary search and maintenance are becoming important to deal with "big data". Many big data applications require not only large data handling, but also supporting massive continuous updates (insertion, deletion) and search requests including longest common prefix (LCP) matching and range queries. Therefore, it is very important to develop methods to store data with very fast search and update capability. Family of search tree (e.g., binary search tree, or B+ tree) has been used in many database management systems, but those methods are becoming too slow and expensive for big data applications. Distributed hashing methods are used in many big data management systems for speed and scalability, but hashing based systems have very large time penalties for operations like range query. Family of trie including PATRICIA trie have been known to have good theoretical running times for dictionary operations, but run very slowly in practice due to many random memory accesses needed.

BRIEF DESCRIPTION OF THE DRAWINGS

FIG. 2A is diagram illustrating an example of a set of input strings.

FIG. 2B is a diagram illustrating an example of a trie of the set of input strings.

FIG. 2C is a diagram illustrating an example of a PATRICIA trie representation of the set of input strings built based on the trie of FIG. 2B.

FIG. 5 is a control flow of a computer system for selecting different families of dictionary techniques to operate a dictionary.

FIG. 6A illustrates a set of instructions embodying a log WE_LCP(node, p, pos, L) operation for use in the first LCP module of FIG. 5.

FIG. 6B is a diagram illustrating how the Log WE_LCP operation traverses through a log W elevators data structure.

FIG. 6C illustrates a set of instructions embodying an Insert(x,Ds) operation for use by the first insertion module of FIG. 5.

FIG. 6D illustrates a set of instructions embodying a Delete(x,Ds) operation for use by the first deletion module of FIG. 5.

FIG. 6E illustrates a set of instructions embodying a RangeQuery(x,y,Ds) operation for use by the first range query module of FIG. 5.

FIG. 6F illustrates portions of a PATRICIA trie being traversed as part of the RangeQuery operation of FIG. 6E.

FIG. 7C illustrates a set of instructions embodying a LCP_Hybrid (knode, x, pos) operation for use in the second LCP module of FIG. 5.

FIG. 7D illustrates a set of instructions embodying an Insert(x,Ds) operation for use by the second insertion module of FIG. 5.

FIG. 7E illustrates a set of instructions embodying a Delete(x,Ds) operation for use by the second deletion module of FIG. 5.

Figure 1:
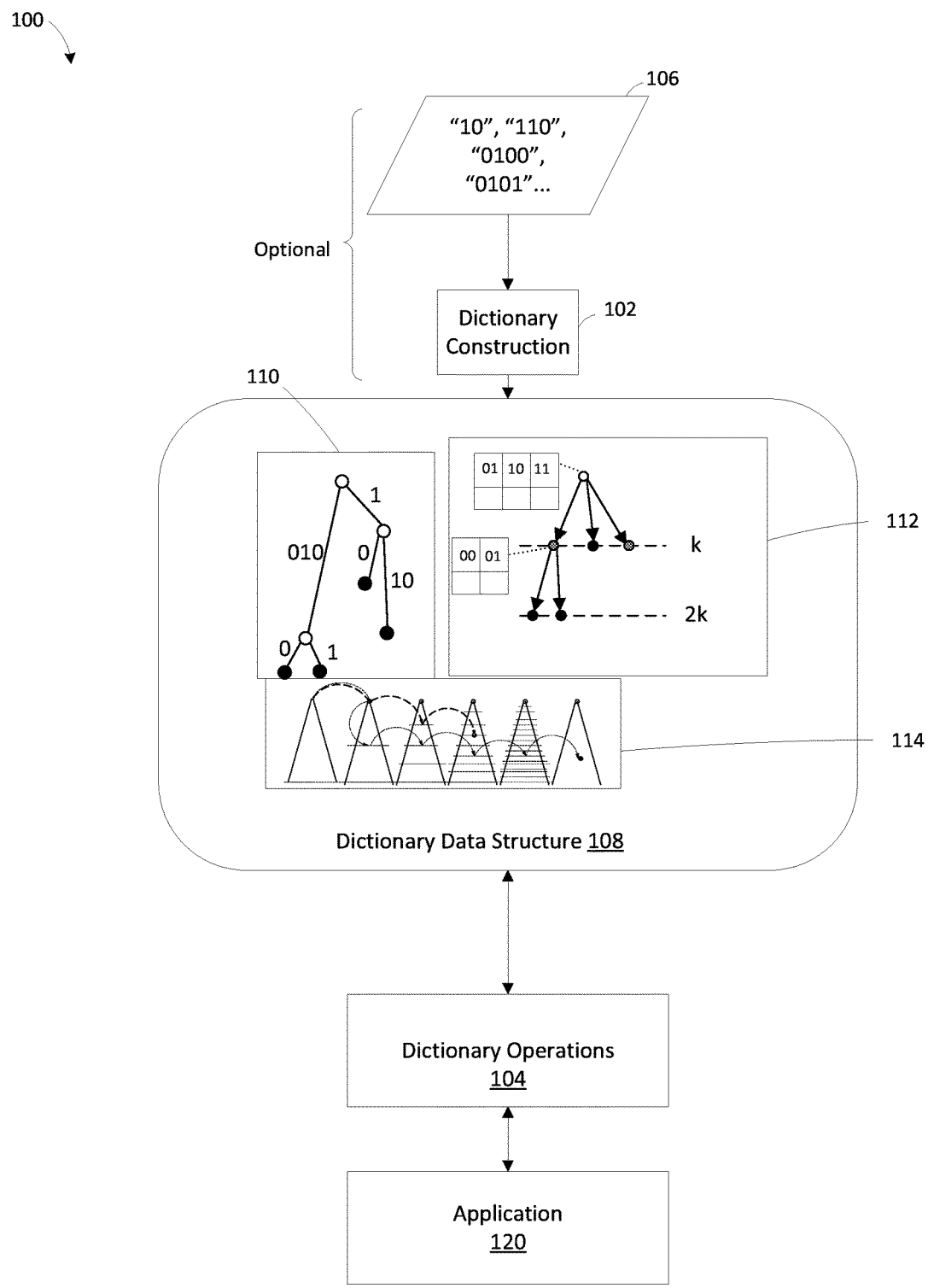
FIG. 1 is a control flow diagram illustrating a system architecture of a computer-implemented dictionary.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Disclosed is a technique to construct, search and maintain a dictionary of a set of strings on modern computer systems. The technique can store and retrieve strings fast by constructing elevator-stairs tree and/or a log W elevators data structure (i.e., multiple elevator-stair trees of different strides) together with PATRICIA trie. The technique can include constructing a PATRICIA trie from the set of strings and facilitating operations by also constructing an elevator-stairs tree and/or a log W elevators data structure (i.e., multiple elevator-stair trees of different strides). The technique can include switching between accessing the PATRICIA trie via just the log W elevators data structure or a hybrid between the elevator stairs tree and the log W elevators data structure, depending on whether an application requires a dictionary query that would be longer than a register size of the computer system or not. The disclosed technique enables fast searches and updates while supporting range queries through elevator-stairs tree and/or a log W elevators data structures.

Let W be one plus the length of the longest possible common prefix of the strings in the dictionary. That is, a prefix of length W can uniquely identify each string. The claimed technique adds additional data structure to PATRICIA trie to drastically reduce the upper bound of the running times (and average running times) to perform a Search operation from O(W) to O(1), and LCP, Insert and Delete operations from O(W) to O(log(W)) while maintaining fast and scalable range queries naturally supported by PATRICIA trie. Table 1 compares the performances of dictionary methods mentioned above, including the claimed technique when W characters fit in a register of a computer system. Here, the notation "O(W)," "O(1)," "O(W)," etc. associated with respective operations refer to the upper bounds of running times when executing each operation.

TABLE 1

The comparison of upper limits of the running time of exemplary dictionary data structures.

| | Search time | Range Query | Update |
|---|---|---|---|
| The Claimed Method | O(1)(Extremely Low) | O(W + the number of result)(Low) | O(log W)(Very Low) |
| Hashing | O(1)(Extremely Low) | Greater than O(N)(Very High) | O(1)(Extremely Low) |
| PATRICIA trie | O(W)(Low) | O(W + the number of result)(Low) | O(W)(Low) |
| Search Tree | O(log N)(High) | O(log(N) + the number of result) (High) | O(log N)(High) |

The claimed dictionary methods have a wide range of applications. For example, the disclosed dictionary and its operations can be used for substring search of text data, such as documents and DNA sequences, by creating a dictionary of all suffixes and perform prefix searches on them. The disclosed dictionary and its operations can also be used to index key-value data by treating keys as strings of bits. IP routing table lookup problem can be solved through finding the LCP from the dictionary. Overall, the fast and scalable update capability enables the disclosed technique to be applied to the problems that dictionary methods previously have not been used for because of the speed or scalability. For example, Sorting n strings of length W has an upper bound of O(n log(W)) running time, if W characters fit in a register of the computer system. For sorting integers or floating point numbers (e.g., 32-bit, 64-bit, or 128-bit binary strings), running time of the disclosed technique would be O(n log(128)), which is actually O(n) time. This running time is much faster and more scalable than well-known quick sort or merge sort algorithms which has O(n log n) running time.

Note that the proposed methods can replace search trees and sorting algorithms only when the order that defines the range query matches the lexicographic order. Unsigned integers in most computer systems fall in this case. For signed integers and floating point numbers, range query must be slightly modified to work correctly. Modification methods are described further below.

Strings can be words spelled in alphabet, documents, IP addresses, DNA sequences, integers, floating points used in the computer systems (i.e., as string of bits), or any combination thereof. Operations supported by the dictionary are the following: Insert, Delete, Search, Longest Prefix Match (LPM) or Longest_Common_Prefix (LCP) matching (i.e., given a string x, LCP returns the length of the longest common prefix of x and an element in the dictionary having a longest possible common prefix with x), Predecessor (i.e., an operation to find a preceding string in a sorted order of the set of strings), Successor (i.e., an operation to find a subsequent string in a sorted order of the set of strings), RangeQuery and Sort. LCP computes a longest common prefix of x against all possible elements in the dictionary and pick the longest match amongst all of the longest common prefixes.

Let n be the number of the strings in the dictionary and W be one plus the length of the longest possible common prefix of the strings in the dictionary (i.e., prefix of length W can uniquely identify each string). If W characters fit the register of the computer system being used, then the running time for the following operations of the disclosed dictionary are as follow:

Search operation takes constant time;

LCP, Insert and Delete operations takes O(log W) running time;

Predecessor and Successor operations takes O(W) running time;

RangeQuery operation takes O(W+(number of strings to be reported)) running time; and Sort operation takes O(n log(W)) running time.

When W is long and W characters do not fit in a processor register of length r, the upper bound of some operations stays the same, while the upper bound of the following operations are changed as follows:

Search operation takes O(W/r) running time;

LCP, Insert and Delete operations takes $$O\left(\frac{W}{r} + \log r\right)$$

running time; and

Sort operation takes $$O\left(n * \left(\frac{W}{r} + \log r\right)\right)$$

running time.

The disclosed technique can be an optimal method to compute LCP while supporting fast and scalable updates (Insert and Delete). The disclosed technique can also be an optimal method that can search and update while supporting fast range queries. Note that the running times of most operations except Sort do not depend on the number of strings in the dictionary. That is, the performance of the claimed dictionary does not degrade at all even with a huge amount data. This property makes the claimed dictionary methods suitable for large sets of strings as well as the small ones. The upper bound of the running times is significantly faster than existing dictionary methods and can be applied to document search engine, enterprise databases, social network data stores, cloud storage indexing, DNA and protein database and analytics, and various other "big data" applications.

GLOSSARY

It is noted that certain terms and phrases have been highlighted in this disclosure for clarity, including underlining, capitalization, and/or bolding. However, such highlighting does not denote a limitation or a preference. For clarity, various parameters of the disclosed techniques are defined below:

In the context of average running times, expected running times, and upper limit of running times, $f(n) \in O(g(n))$ or $f(n) = O(g(n))$ means that there are positive constants c and k, such that $0 \leq$ running time of $f(n) \leq$ running time of $cg(n)$ for all $n \geq k$. This is a standard definition of the big-Oh notation known to one of ordinary skilled in the art.

S: set of all the strings in the dictionary.

For string x, $x[i]$ represents the $i^{th}$ bit of x and $x[i \ldots j]$ represents the substring of x between $i^{th}$ and $i^{th}$ position.

$D_S$: The dictionary that contains all the strings in the set S.

n: number of elements in S.

W: One plus the length of the longest possible common prefix of the strings in the dictionary (i.e., prefix of length W can uniquely identify each string). W is defined using the longest common prefixes, which is sometimes hard to find, or changes after updates of the data. Alternatively, W can be set to the length of the longest string in the dictionary for the algorithms to execute correctly. Analyzing and deriving smaller W can help reduce running times. The disclosed dictionary can (without modifying the techniques described) perform dictionary operations even when the W selected is not the longest possible common prefix in the dictionary.

r: the number of characters that fit in a register of the computer system used.

Search(x, $D_S$): Search a string x in the dictionary that contains S. Returns "True" if $x \in S$, returns "False" otherwise.

LCP(x, $D_S$): Longest Common Prefix: Given a string x, returns the length of the longest common prefix of x and an element in S having a longest possible common prefix with the string x.

Insert(x, $D_S$): Modify the $D_S$ to $D_{S \cup \{x\}}$, that is, to add a dictionary entry of x (i.e., a string).

Delete(x, $D_S$): Modify the $D_S$ to $D_{S - \{x\}}$, that is, to remove a dictionary entry of x (i.e., a string) from the dictionary $D_S$.

Predecessor(x, $D_S$): Find $y \in S$ which is the largest string among the strings that are smaller than x in the lexicographic order.

Successor(x, $D_S$): Find $y \in S$ which is the smallest string among the strings that are larger than x in the lexicographic order.

RangeQuery(x, y, $D_S$): Find the set of strings in S that is lexicographically larger than x and smaller than y, and list them in ascending order.

Sort(S): Given a set of strings S, list all the elements of S in a lexicographically ascending order.

$$STime(D_S) := \begin{cases} O(\log W) & \text{if } W \leq r \\ O\left(\left\lfloor \frac{W}{r} \right\rfloor + \log r\right) & \text{otherwise} \end{cases}$$

Although the disclosed dictionary technique can take a set of any strings (e.g., alphabets, numbers, or a combination thereof) as an input, certain illustrations and descriptions in this disclosure assume the following conditions solely for the purpose of making the description easier to understand:

Illustrative Condition 1: There is no string that is a prefix of other string. For example, under this condition, the case that both x=101 and y=10110 is in the dictionary where x is a prefix of y is not considered.

Illustrative Condition 2: All the strings in the dictionary are binary strings.

Condition 1 ensures that each string is represented at the leaf of a PATRICIA trie. Condition 2 ensures that PATRICIA trie of the set of the strings will be full binary tree (i.e., a binary tree where all the internal nodes have two children). If the input strings do not agree with the illustrative condition, modification to the input strings or modification to the disclosed dictionary operations can be made to accommodate the strings. Methods to process the strings that do not satisfy the conditions can be accommodated in the disclosed dictionary system, and techniques are described below.

Either a pre-processing of input strings or an adjustment to the trie structure associated with the disclosed dictionary technique can enable the dictionary operations to process general strings of any alphabets without restrictions. Illustrative condition 1 can be removed by allowing string nodes in a PATRICIA trie that only have one child. Alternatively, the input strings can be modified to fit illustrative condition 1. A special character that is not in the alphabet can be attached to the end of all strings in the dictionary. This character can mark the end of the string and ensure that no string is a prefix of another string in the dictionary. For example, if two strings "ATA" and "ATAGC" are to be included in a dictionary, this case violates the illustrative condition 1. However, these strings can be padded with a special character "#", modified to "ATA#" and "ATAGC#". After this modification, neither of the two strings is a prefix of another, and the illustrative condition 1 would be satisfied.

The illustrative condition 2 that all strings are binary strings is not a necessary requirement to implement the disclosed technique because each node in the PATRICIA trie associated with disclosed dictionary technique may be allowed to have three or more child nodes. For example, the alphabet used for DNA sequence is {A,C,G,T}, and thus each node in the PATRICIA trie can be allowed to have up to four child nodes. Also, any alphabet strings can be encoded into binary strings to satisfy illustrative condition 2. DNA sequences would be encoded into binary strings using the following rule: A={00}, C={01}, G={10}, T={11}. Then, DNA sequence ATC will be converted to "001101".

FIG. 1 is a control flow diagram illustrating a system architecture 100 of a computer-implemented dictionary. The system architecture 100 can be implemented on a computer system including one or more computing devices. For example, the computer system can be a mobile electronic device, a desktop computer, a computer server, a virtualized computing environment (e.g., a virtual machine), an application specific integrated circuit (ASIC), a field-programmable gate array, a cloud computing environment, or the computer system 800 of FIG. 8. The system architecture 100 includes at least a dictionary construction module 102 and a dictionary operations module 104.

For example, the dictionary construction module 102 can process a set of strings 106 to construct a dictionary data structure 108. The set of strings 106 can include words spelled in alphabet, documents, IP addresses, DNA sequences, integers, floating points used in the computer systems (string of bits), or any combination thereof. Construction of the dictionary data structure 108 may include building of a PATRICIA trie 110 from the set of strings 106. The construction of the dictionary data structure 108 may also include building an elevator stair tree structure 112 from the set of strings 106 and the PATRICIA trie 110. The construction of the dictionary data structure 108 can yet further include building a log W elevators data structure 114 from the set of strings 106.

The dictionary operations module 104 is capable of interfacing with an application 120 that needs to access, update, and maintain the dictionary data structure 108. The dictionary operations module 104 can interface with various applications including search engines, databases, analytical tools, predictive tools, or other applications involving a large volume of data.

For example, the dictionary operations module 104 can be configured to insert a string to the dictionary data structure 108 or delete a string from the dictionary data structure 108. The dictionary operations module 104 can output a sorted order from the dictionary data structure 108. The dictionary operations module 104 can also be configured to search for a particular string in the dictionary data structure 108, identify a string in the dictionary data structure 108 with a longest matching prefix to an input string, identify a predecessor of an input string in a sorted order of the set of strings 106, and identify a successor of an input string in the sorted order of the set of strings 106. The dictionary operations module 104 can perform a range query to return a subset of the set of strings 106 within a particular range and sort the set of strings 106.

FIG. 2A is diagram illustrating an example of a set of input strings 202. FIG. 2B is a diagram illustrating an example of a trie 204 of the set of input strings 202. The trie 204 (also known as a radix tree or a prefix tree) is an ordered tree data structure. A path from the root node of the trie 204 to another node in the trie 204 can define a prefix string in a dictionary of the input strings 202. A trie is a tree data structure made from a set of bit strings $x_1, x_2, \ldots, x_n$ (e.g., the set of input strings 202) with the following properties:

each edge is labeled with exactly one bit;
for any node, edges connected to its child nodes have distinct labels; and
every string $x_i$ is mapped to some node v in the tree such that the concatenation of the bits on the path from the root to node v exactly spell out $x_i$, and every leaf of the tree is mapped to some string.

FIG. 2C is a diagram illustrating an example of a PATRICIA trie representation 206 of the set of input strings 202 built based on the trie 204 of FIG. 2B.

A PATRICIA trie, such as the PATRICIA trie representation 206, can be created from the trie 204 by compressing each maximal non-branching path into one edge. Then, a PATRICIA trie edge may represent a sequence of bits, called its edge label. Let the path label of a path in PATRICIA trie be the concatenation of edge labels along the path, and let the string depth of a node be the length of the path label from the root to the node. Nodes in level l in a PATRICIA trie is defined as a set of all the nodes that are at string depth l. Edges at level l is defined as all edges between two nodes such that one is at a string depth<l and the other is at a string depth>l. In the context of key-value-store use, PATRICIA tries can be used to manage keys. The value associated with a key can be stored outside of PATRICIA trie (in random access memory or even in persistent storage space, such as disk space or non-volatile storage space), and the node in PATRICIA trie that corresponds to the key can store a pointer to where the value is stored.

Figure 2D:
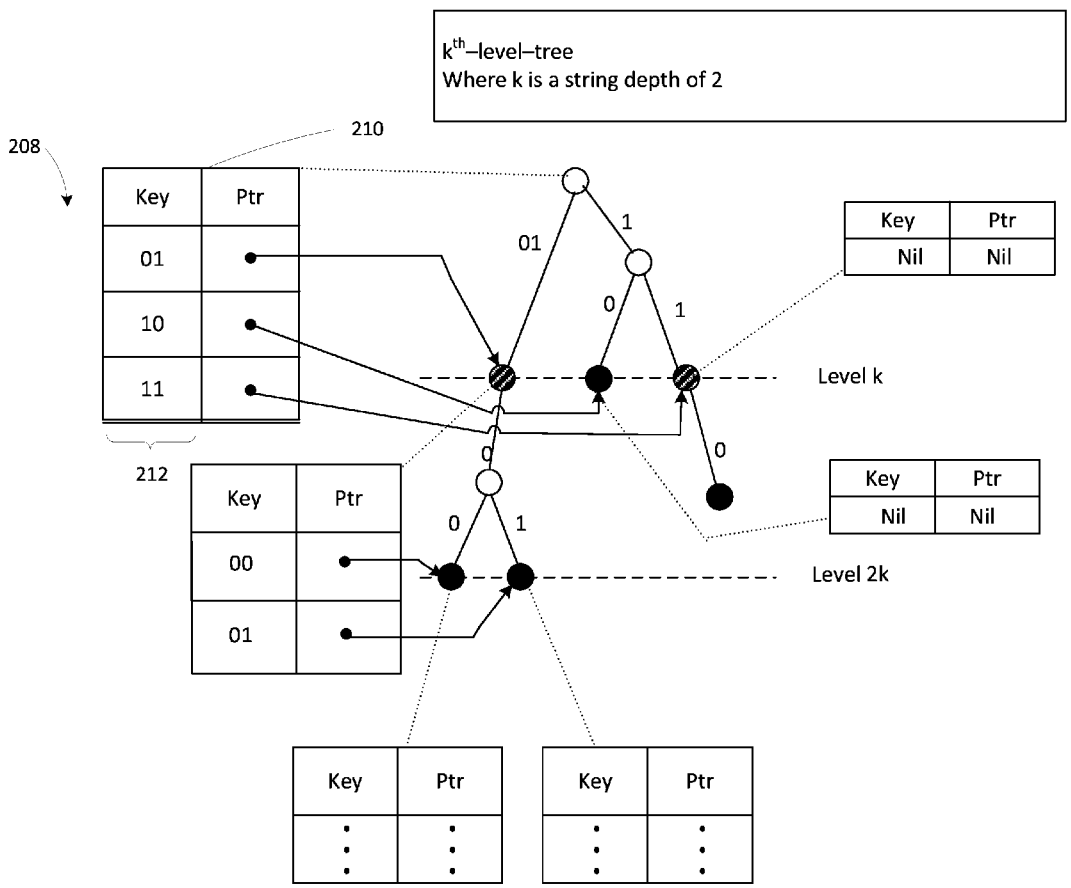
FIG. 2D is a diagram illustrating an example of an elevator-stairs data structure based on the PATRICIA trie of FIG. 2C.

FIG. 2D is a diagram illustrating an example of an elevator-stairs data structure 208 based on the PATRICIA trie illustrated in FIG. 2C. The elevator-stairs data structure 208 can be a tree of linking hash tables as shown. Construction of the elevator-stairs data structure 208 can modify the PATRICIA trie by inserting hash tables 210 to nodes at integer multiples of a constant string depth "k". Where a node does not exist at an integer multiple of the constant string depth "k", a non-branching node can be inserted into the PATRICIA trie. The elevator-stairs data structure 208 can be constructed as a set of nodes (corresponding to the modified PATRICIA trie) at integer multiples of the constant string depth "k", each having a hash table. Each hash table 210 at a string depth of a first multiple of "k" can associate hash keys 212 to nodes at a string depth of a next integer multiple of "k". For example, a hash table 210 at a string depth of "2k", can have hash keys 212 linking nodes at a string depth of "3k." The hash keys 212 represent a substring of length "k" of one or more input strings.

The hash table 210 can have multiple bits or characters as hash keys 212 to skip each "k" level of the PATRICIA trie 206. The elevator-stairs data structure 208 can be referred to as a $k^{th}$-level-tree. That is, the elevator-stairs data structure 208 is created so that the search and update operations can jump k levels (i.e., string depth) of the PATRICIA trie 206, where k is an integer between 1 and W. Each hash table 210 of the $k^{th}$-level-tree can reference or link to nodes of the PATRICIA tree at a multiple of k levels from the root of the PATRICIA trie 206.

Figure 2E:
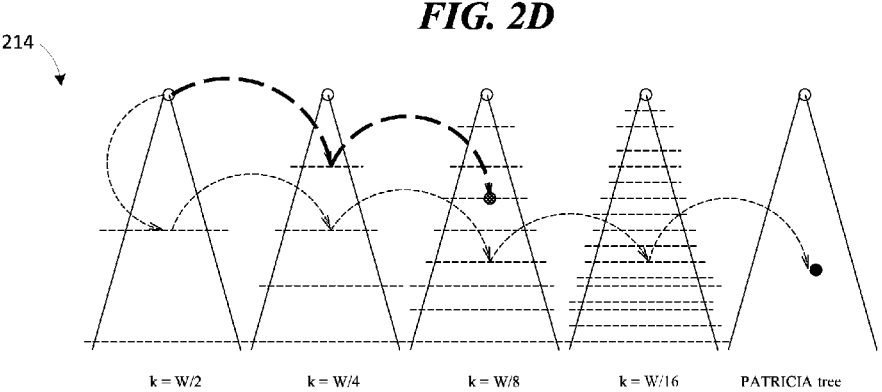
FIG. 2E is a diagram illustrating an example of log W elevators data structure based on a set of elevator-stairs data structures.

FIG. 2E is a diagram illustrating an example of log W elevators data structure 216 based on a set of elevator-stairs data structures. The log W elevator data structure 216 is constructed as a set of elevator-stairs data structures at different exponentially reducing k-levels, where nodes at multiple of k-levels in a first elevator-stairs data structure is linked to nodes, representing the same node in the PATRICIA trie 206, at multiple of k' levels in a next elevator-stairs data structure in terms of reducing k-levels. As shown, the first elevator-stairs data structure of the set can be for k-levels of W/2. The second elevator-stairs data structure of the set can be for k-levels of W/4. The last elevator-stairs data structure of the set can be the PATRICIA trie. In some embodiments, the first elevator-stairs data structure of the set can be for k-level of W. That is, the first elevator-stairs data structure can be a hash table of the set of strings.

Figures 3A, 3B:
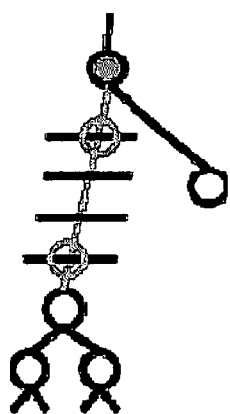
FIG. 3A is an example set of instructions to build a $k^{th}$-level-tree.
FIG. 3B is an example of a $k^{th}$-level-tree having a reduced number of $k^{th}$-level nodes added.
Figure 3C:
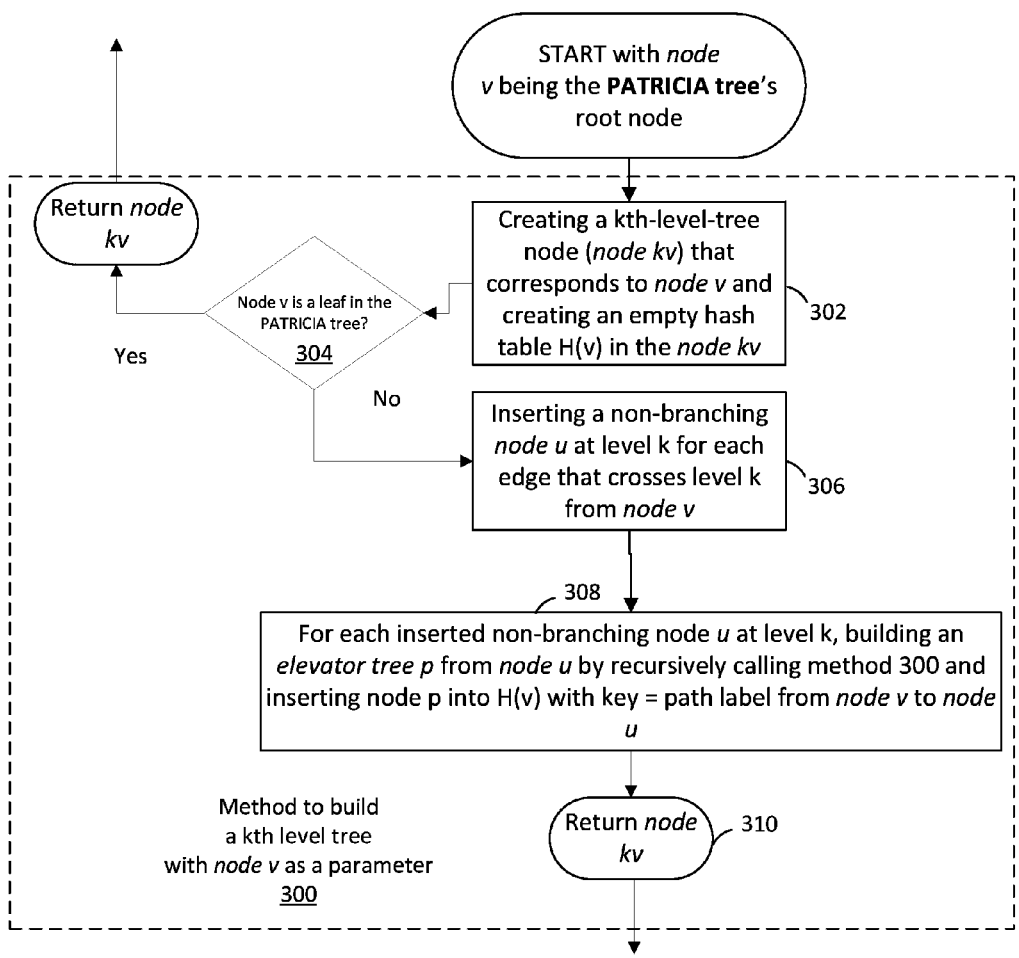
FIG. 3C is a flow chart representation of FIG. 3A.

FIG. 3A is an example set of instructions 300 (e.g., pseudo-code) to build a $k^{th}$-level-tree (i.e., an elevator-stairs tree). FIG. 3C is a flow chart representation of a method 300 of executing the instructions of FIG. 3A. The method 300 takes an inputting parameter of a tree node (the "input node"). The method 300 outputs a tree node pointing to a root node of a kth-level-tree node. The method 300 can be recursively called. When the method 300 is first called, the inputting parameter can be the root node of a PATRICIA trie constructed for a set of strings. The method 300 begins with step 302 of creating a kth-level-tree node with the inputting node and creating an empty hash table in the kth-level-tree node. At step 304, the method 300 checks if the input node is a leaf node. If the input node is a leaf node, the method 300 returns the kth-level tree node created in step 302. If the input node is not a leaf node, then the method 300 moves onto step 306. In step 306, for each edge of the PATRICIA trie that crosses the level k from the input node, a non-branching node u is inserted at level k into the PATRICIA trie. Then in step 308, for each inserted non-branching node u at level k, the method 300 builds an elevator tree p from node u by recursively calling method 300 and inserting node p into H(v) with key being the path label (of the PATRICIA trie) from node v to node u. The method 300 then terminates in step 310 and return the kth-level-tree node.

To save the space and execution time, in some embodiments, a slight modification of the $k^{th}$-level-tree can be performed as follows: If an edge in the PATRICIA trie is added with more than two non-branching nodes in the $k^{th}$-level-tree, only the upper most (the closest to the root) non-branching node and the lower most non-branching node are kept and connected with a pointer so a search operation can traverse down the tree. For example, FIG. 3B is an example of a $k^{th}$-level-tree in accordance with this modification to the creation of the kth-level-tree.

The set of instructions 300 embodies a function to build the elevator stairs data structure through recursion. The variable "v" denotes a pointer to a node in a PATRICIA trie that is already constructed. Initially before the recursion begins, the pointer v can point to a root node of the PATRICIA trie. Because the $k^{th}$-level-tree of the elevator stairs data structure is constructed through recursion, the variable "v" may point to intermediary nodes during the construction of the kth-level-tree. "Level k" refers to a string depth. The node "kv" represents a root node of a tree being built with hash tables as embedded in its $k^{th}$ level nodes.

Operations for Search, Insertion, Deletion in the hash table 210 used in $k^{th}$-level-tree has a O(1) expected running times, when the hash key 212 fits in a processor register of a computer system performing the operations. Although the worst case running time may take longer, the actual running times tend to be tightly around the expected running time with a proper choice of hashing strategies and hash functions. Here after, the running times of Search, Insertion, and Deletion in the hash table are treated as having an upper bound of O(1), even though in a strict sense, O(1) describes the upper bound of the expected running time.

Figures 4A, 4B:
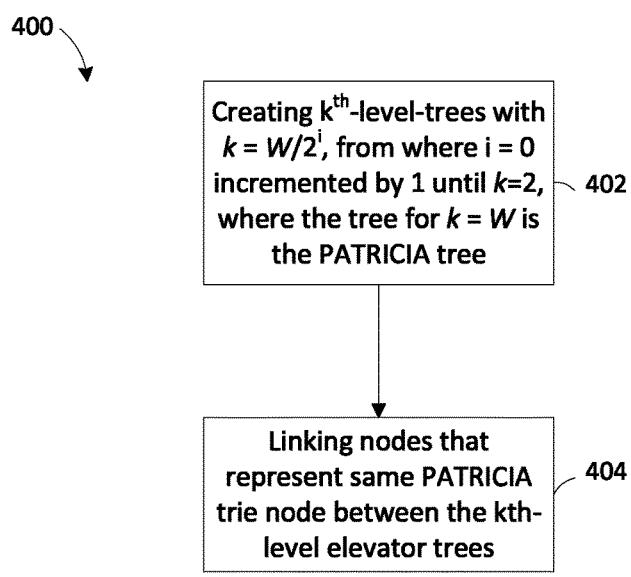
FIG. 4A is an example set of instructions to build a log W elevators data structure from multiple $k^{th}$-level-trees.
FIG. 4B is a flow chart representation of FIG. 4A.

FIG. 4A is an example set of instructions 400 (e.g., pseudo-code) to build a log W elevators data structure from multiple $k^{th}$-level-trees. FIG. 4B is a flow chart representation of FIG. 4A. The log W elevators data structure is built by constructing multiple $k^{th}$-level-trees at exponentially reducing k levels while linking nodes representing the same node in the PATRICIA trie between neighboring $k^{th}$-level-trees.

Figure 8:
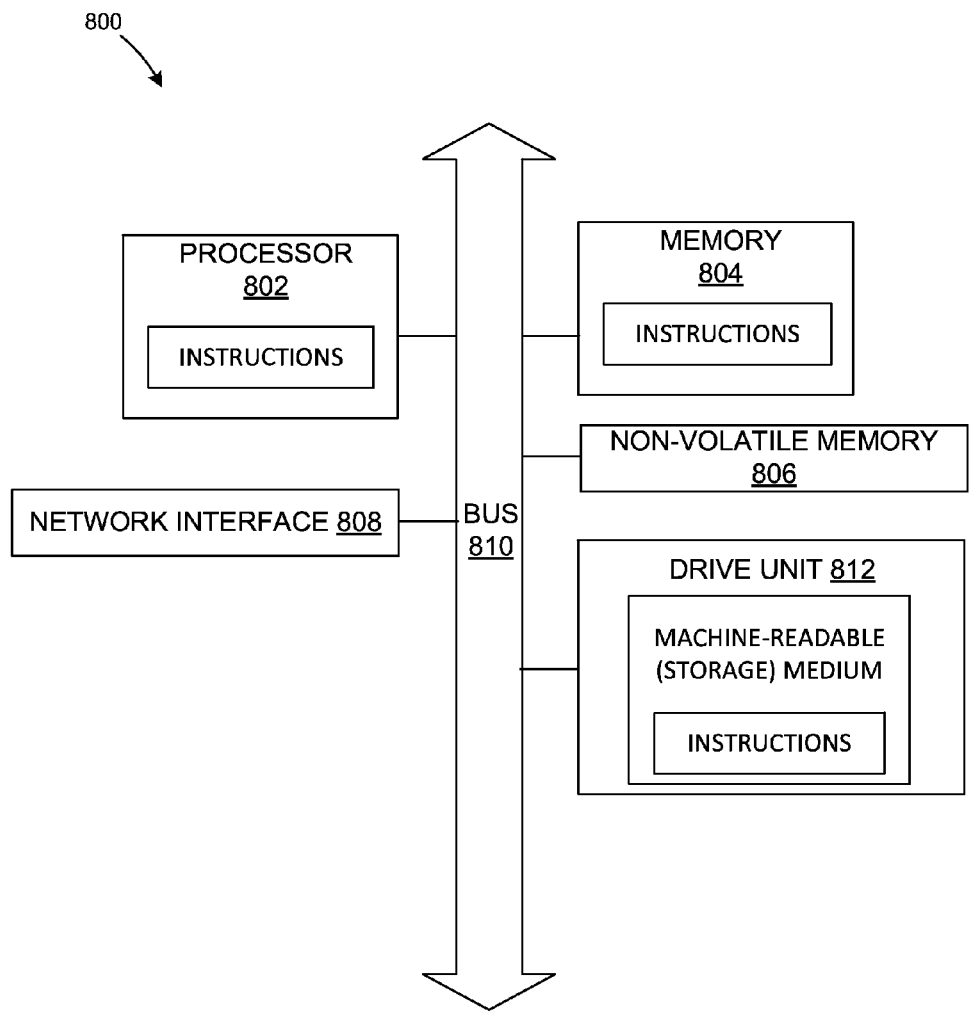
FIG. 8 is a diagrammatic representation of a machine in the example form of a computer system within which a set of instructions, for causing the machine to perform any one or more of the methodologies or modules discussed herein, may be executed.

FIG. 5 is a control flow of a computer system 500 (e.g., a computer system implementing the system architecture 100 of FIG. 1 or the computer system 800 of FIG. 8) for selecting different families of dictionary techniques to operate a dictionary. In some embodiments, the selection of data structure techniques is done in real-time. In other embodiments, the data structures are pre-selected and pre-configured depending on the application for using the dictionary data structure. Customizing the dictionary between these two different families of operation processes enables operations of the dictionary to run faster and be more scalable. The computer system 500 includes two families of processes for maintaining a dictionary structure on the computer system 500 depending on the register size of the computer system 500 and the maximum string size intended to be placed in the dictionary. That is, a particular family of operation processes is selected depending on the length of the strings in the dictionary to be maintained and the "register size" r, which is the number of bits that a processor can process in one step (e.g., 32-bit, 64-bit processing systems). A first family of processes 506 corresponds to a first case when every string fits in a register of the computer system in its entirety. A second family of processes 508 corresponds to a second conditional case when strings are too long to fit in the register of the computer system 500. If some of the strings fit in the register and some of the strings do not, either case can be used. Optimally, if a majority of the strings each has unique prefix of "r" bits, then the first family of processes 506 should be used.

Case 1: W≤r

In most modern computer processor architectures, the time taken to read/write/process (processing includes most simple operations such as basic arithmetic operations, memory address references) one bit and r bits is about the same. This case assumes that reading any portion of the string takes the same time. The first family of processes 506 can include a first LCP module 512, a first search module 514, a first insertion module 516, a first deletion module 518, a first predecessor module 520, and a first successor module 522. The operations embodied by at least the first LCP module 512, the first search module 514, the first insertion module 516, and the first deletion module 518 takes O(log W) running time. Because W, is a constant representing one plus the length of the longest possible common prefix of the strings in the dictionary, the expected running time of hashtable access takes O(1) running time.

LCP Operation

The first family of processes 506 can include the first LCP module 512 to perform a LCP operation via a log W elevators data structure constructed from a set of strings for the dictionary. FIG. 6A illustrates a set of instructions embodying a log WE_LCP(node, p, pos, L) operation 602 for use in the first LCP module 512 of FIG. 5. In particular, FIG. 6A shows how binary search of $LCP(x,D_S)$ is taken place. The operation LCP(x,Ds) can call the log WE_LCP operation 602 with the parameters log WE_LCP(root of the $W/2^{th}$ level tree for $D_S$, x, 0, W). The log WE_LCP operation 602 implements the $LCP(x,D_S)$ operation recursively using the log W elevators (i.e., $k^{th}$-level-trees) to achieve fast dictionary operations. Here, $LCP(x,D_S)$ will call log WE_LCP with the elevator trees with k=W/2, W/4, ..., 2 (assuming that W is a power of 2). In the base case when L=1, the output of the $LCP(x,D_S)$ operation is the length of the longest common prefix of x and an element in S matching the longest common prefix. $LCP(x,D_S)$ takes O(log W) running time to execute.

FIG. 6B is a diagram illustrating how the Log WE_LCP operation 602 traverses through a log W elevators data structure 604. Thick dashed lines illustrated in FIG. 6B depict lookup hops for LCP at level (W/4+W/8) and thin dashed lines show the lookup hops for LCP at level (W/2+ W/4+W/8+1).

Search Operation

The first family of processes 506 can include the first search module 514 to perform a Search operation via the log W elevators data structure. Search(x, $D_S$) can be implemented by modifying the LCP operation. If an LCP operation finishes at a leaf node of PATRICIA trie, then there is a matching string of x in $D_S$. In that case, the Search operation can return "TRUE" and/or a pointer to the leaf node. Otherwise, the Search operation can return FALSE. The Search operation takes almost same time as LCP, which is O(log W) if W≤r. If we know that all the strings in the dictionary are of length W, expected running time of the Search operation can be reduced by adding a hash table (i.e., a kth-level-tree with k=W) to the log W elevators data structure. With this modification, the expected running time for the Search operation takes the same time as accessing a hash table, which takes O(1) running time.

Insert Operation

The first family of processes 506 can include the first insertion module 516 to perform an Insertion operation via the log W elevators data structure 604. FIG. 6C illustrates a set of instructions embodying an Insert(x,Ds) operation 606 for use by the first insertion module 516 of FIG. 5. The Insert operation 606 can leverage the LCP operation 602 to determine where to insert the string value x in the dictionary $D_S$. Insertion takes O(log W) running time.

Deletion Operation

The first family of processes 506 can include the first deletion module 518 to perform a Deletion operation via the log W elevators data structure 604. FIG. 6D illustrates a set of instructions embodying a Delete(x,Ds) operation 608 for use by the first deletion module 518 of FIG. 5. Deletion takes O(log W) running time.

Predecessor and Successor Operations

The Predecessor and Successor operations implemented by the first predecessor module 520 and the first successor module 522 can be executed with an upper bound of O(W) running time. This running time can be achieved by constructing a PATRICIA trie in the Log W elevators data structure 604 in a sorted manner. For example, assuming: a left edge of an internal node of the PATRICIA trie is the edge whose edge label starts with 0; a right edge of the internal node is the edge whose edge label starts with 1; a child node connected by left edge is left child; and a child node connected by the right edge is right child. Leaf nodes of the PATRICIA trie are arranged in a lexicographically sorted order from left to right if, during construction of the PATRICIA trie, the left child is constructed to the left, and the right child is constructed to the right of each parent node in the PATRICIA trie.

Under this scheme of constructing the PATRICIA trie, the operations Successor(x, $D_S$) can be computed by first executing LCP(x,$D_S$). If LCP(x,$D_S$) finishes at a leaf node, Successor(x, $D_S$) is the next leaf node to the right. If LCP(x,$D_S$) does not finish at leaf, Successor(x, $D_S$) is the left most leaf in the subtree under where LCP(x,$D_S$) finishes. Both cases involves a tree traversal of PATRICIA trie and have an upper bound of O(W) worst case running time in addition to computing LCP(x,$D_S$). Overall running time is O(W). Likewise, the Predecessor operation can be computed in a similar way, and also takes O(W) time to compute.

It is noted that the directions "left" and "right" denote a lexicographical order and not used to described physical directions. Assignment of the directions are arbitrary, and can be reversed while maintaining the operations of the disclosed dictionary.

RangeQuery Operation

The RangeQuery operation implemented by the first range query module 524 can be executed within an upper bound of O(W+Number of Strings in the Result of the RangeQuery) running time. The running time can be achieved by organizing the PATRICIA trie used in the dictionary in a sorted manner. For example, suppose that a PATRICIA trie is organized in a way that leaf nodes are sorted from left to right, then the RangeQuery(x, y, $D_S$) operation can be seen as listing all the leaf nodes between Successor(x, $D_S$) and Predecessor(y, $D_S$). This can be achieved by traversing the PATRICIA trie from Successor(x, $D_S$) to Predecessor(y, $D_S$).

FIG. 6E illustrates a set of instructions embodying a RangeQuery(x,y,Ds) operation 610 for use by the first range query module 524 of FIG. 5. For ease of explanation, "x" is assumed to be sequentially less than "y". The RangeQuery operation 610 includes traversing part of the PATRICIA trie starting from Successor(x, $D_S$) to Predecessor(y, $D_S$) while outputting the leaf nodes encountered during the traversal.

FIG. 6F illustrates portions of a PATRICIA trie 620 being traversed as part of the RangeQuery operation 610. As shown, a common ancestor node 622 is identified during the traversal. A depth first traversal from the common ancestor node 622 is made to identify leaf nodes 624 between a predecessor node 626 and a successor node 628, traversing from the left of sub tree from the common ancestor node 622 to the right of the sub tree.

Running Time of RangeQuery

The RangeQuery operation has an upper bound of O(W+(number of the strings in the result)) running time. The operation of finding the lowest common ancestor node 622 has an upper bound of O(W) running time for comparing two strings of length W (e.g., in STEP 1 and STEP 2). Looping through a direct path from the successor node 628 to the lowest common ancestor node 622 and then to the predecessor node 626 (e.g., in STEP 3 and STEP 4) includes an iteration with an upper bound of O(W) running time. For a full binary tree (i.e., a tree structure whose internal nodes always have two children) with m leaves, there are a total of 2m−1 nodes in total. Depth first traversal of such binary tree with m nodes has an upper bound of O(m) running time. Hence, total time spent iterating through nodes between the predecessor node 626 and the successor node 628 has an upper bound of O(number of the strings in the result−2) running time (e.g., in STEP 3.1 and 4.1). As a result of adding all of the steps in the RangeQuery operation, the upper bound of the total execution time of RangeQuery(x, y, Ds) has O(W+(number of the strings in the result)) running time.

The RangeQuery(x, y, Ds) operation 610 can be modified in order to deal with strings that are signed integers or floating points. When both x and y are signed integers or floating point numbers, the following two statements are true:

a) Given x≥0, and y≥0, x>y if and only if lexicographic order of x is greater than lexicographic order of y b) Given x<0, and y<0, x<y if and only if lexicographic order of x is greater than lexicographic order of y Given these properties, the RangeQuery(x, y, $D_S$) operation 610, when x≤y, can be implemented in the following way using lexicographic range query. A LexicographicRangeQuery(x, y, $D_S$) operation is a range query operation performed by treating bit representation of numbers as a string of bits. A Reverse(list) operation is an operation that reverses the order of the list. It is noted that the symbol ":" stands for the concatenation of a list before the symbol and a list after the symbol. The RangeQuery(x, y, $D_S$) operation 610 can be performed in the following way:

Case 1: When x, y≥0, RangeQuery(x, y, $D_S$)=LexicographicRangeQuery(x, y, $D_S$)

Case 2: If x, y<0, RangeQuery(x, y, $D_S$)=Reverse(LexicographicRangeQuery(x, y, $D_S$))

Case 3: If x<0, y≥0, RangeQuery(x, y, $D_S$)=Reverse(LexicographicRangeQuery(x, 0, $D_S$)):{z|z=0 if Search(x, $D_S$)=True. z=nil otherwise}:LexicographicRangeQuery(0, y, $D_S$)

Sort Operation

The Sort operation implemented by the first sort module 526 can be executed within an upper bound of O(n·log W) running time, given a set S of n strings of length W. Sorting of a set of strings S can be achieved by:

1) Creating $D_\phi$, which is the empty dictionary;
2) Creating $D_S$ by Insert all the strings of S into $D_\phi$; and 3) Run RangeQuery(lexicographically smallest element, lexicographically largest element, $D_S$).

Step 1 has an upper bound of less than constant time; Step 2 has an upper bound of O(n·log W) running time, where each string is inserted under O(STime(Ds)) running time; and Step 3 has an upper bound of O(n+W) running time. When n>W (which is most cases when the dictionary is scaled up for "Big Data" applications), a Sort operation can have an upper bound of O(n·log W) running time.

Case 2: W>r

The second family of processes 508 can include a second LCP module 532, a second search module 534, a second insertion module 536, a second deletion module 538, a second predecessor module 540, a second successor module 542, a second range query module 544, and a second sort module 546. If the same dictionary technique as case 1 is used when W>r, the upper bound of the running times of the LCP, Search, Insert, and Delete operations would be $$O\left(\frac{W}{r} * \log W\right)$$

because processors can only process r bits at a time and processing W bits string (e.g., evaluating hash function) takes $$O\left(\frac{W}{r}\right)$$

time. A technique, which involves both an elevator stairs data structure constructed as a $r^{th}$-level-tree (i.e., having hash table links for intervals at integer multiples of the register size r) and a Log W elevators data structure, can be used to reduce the upper bound of the running times of the LCP, Search, Insert and Delete operations to $$O\left(\frac{W}{r} + \log r\right).$$

LCP Operation

The second family of processes 508 can include the second LCP module 532 to perform a LCP operation via a mixture of the log W elevators data structure and the elevator-stairs tree data structure both constructed from a set of strings for the dictionary.

Figure 7A:
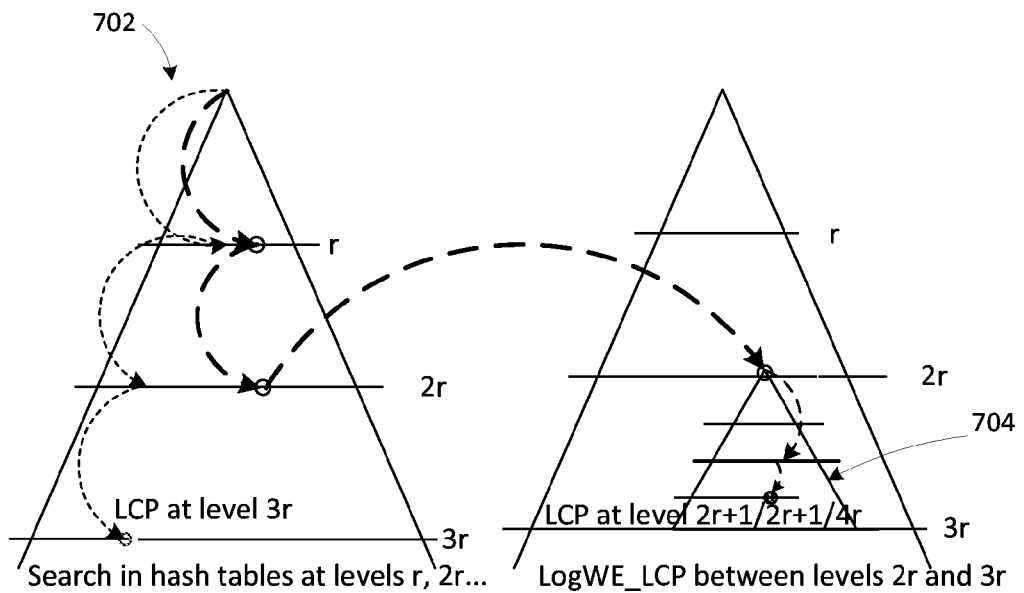
FIG. 7A illustrates LCP search on an Elevator-Stairs data structure when W>r.

The elevator-stairs data structure 702 (i.e., as a $r^{th}$-level-tree) is maintained, such that the LCP operation can traverse down the elevator-stairs tree by matching as many bits as possible that can be read into registers of the computer system. This is illustrated in FIG. 7A. If the elevator-stairs tree traversal cannot continue to the next $r^{th}$ level, then the LCP operation end at the level between the current level and the next $r^{th}$ level. At this point, a Log W elevators data structure 704 can be used to find the matching string in the sub-tree of the PATRICIA trie rooted by the current node and ending at the next $r^{th}$ level. To achieve this, the elevator-stairs data structure embodied by the $r^{th}$-level-tree and the Log W elevators data structure embodied by subtrees of PATRICIA trie that start at level r*i and end at level r*(i+1)−1, where i is a non-negative integer from 0 and up, are maintained. Traversal down the $r^{th}$-level-tree has an upper bound of $$O\left(\frac{W}{r}\right)$$

running time, and traversal down the Log W elevators trees has an upper bound of O(log r) running time. The running time of the LCP operation thus can be at $$O\left(\frac{W}{r} + \log r\right).$$

FIG. 7A illustrates LCP search on an Elevator-Stairs data structure 702 when W>r. Thick dashed lines depict the lookup hops for LCP at level 2r+½r+¼r and thin dashed lines show the lookup hops for LPM at level 3 r.

Figure 7B:
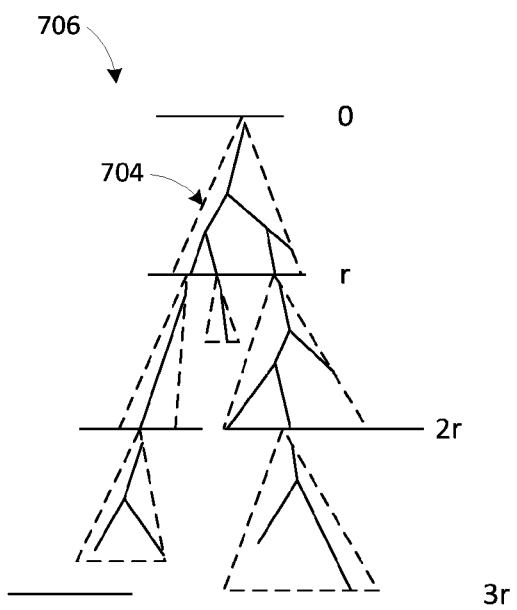
FIG. 7B is a diagram illustrating a PATRICIA trie and a Log W elevators data structure maintained for the second family of processes of FIG. 5.

FIG. 7B is a diagram illustrating a PATRICIA trie 706 and a Log W elevators data structure 704 maintained for the second family of processes 508 of FIG. 5. The Log W elevator trees are maintained for the second family of processes 508 when W>r. Thin solid lines depict the PATRICA trie 706, and the dotted triangles represent the elevator trees of the log W elevators data structure 704 that are maintained to improve the running times of the LCP operation.

FIG. 7C illustrates a set of instructions embodying a LCP_Hybrid (knode, x, pos) operation 712 for use in the second LCP module 532 of FIG. 5. A LCP(x, $D_S$) operation implemented by the second LCP module 332 can call the LCP_Hybrid operation 712 with the following parameters: LCP_Hybrid(root of $r^{th}$-level-tree of $D_S$,x,0).

Search Operation

The second family of processes 508 can include the second search module 534 to perform a Search operation via both the $r^{th}$ level elevator-stairs data structure and the log W elevators data structure. Search(x, $D_S$) can be implemented by modifying the LCP operation in this case as well. If LCP operation finishes at a leaf node of PATRICIA trie, then there is a matching string of x in $D_S$, and thus the Search operation can return "TRUE" and/or a pointer to the leaf node. Otherwise, the Search operation can return FALSE. Hence, the running time of Search Operation closely follows running time of the LCP operation. Accordingly, the upper bound of the Search Operation is $$O\left(\left\lfloor \frac{W}{r} \right\rfloor\right)$$

running time.

Insert Operation

The second family of processes 508 can include the second insertion module 536 to perform an Insertion operation via the $r^{th}$ level elevator-stairs data structure and the log W elevators data structure. FIG. 7D illustrates a set of instructions embodying an Insert(x,Ds) operation 714 for use by the second insertion module 536 of FIG. 5. The Insert operation 714 can leverage the LCP_hybrid operation 712 to determine where to insert the string value x in the dictionary $D_S$.

Deletion Operation

The second family of processes 508 can include the second deletion module 538 to perform a Deletion operation via the $r^{th}$ level elevator-stairs data structure and the log W elevators data structure. FIG. 7E illustrates a set of instructions embodying a Delete(x,Ds) operation 716 for use by the second deletion module 538 of FIG. 5.

Predecessor and Successor Operations

The second family of processes 508 can include the second predecessor module 540 to perform a Predecessor operation via the $r^{th}$ level elevator-stairs data structure and the log W elevators data structure. The Predecessor operation can be performed in a similar fashion as the Predecessor operation in the first family of processes 506 under the same upper bound of O(W) running time.

Likewise, the second family of processes 508 can include the second successor module 542 to perform a Successor operation via the elevator-stairs data structure and the log W elevators data structure. The Successor operation can be performed in a similar fashion as the Successor operation in the first family of processes 506 under the same upper bound of O(W) running time.

Range Query Operation

The second family of processes 508 can include the second range query module 544 to perform a RangeQuery operation via the $r^{th}$ level elevator-stairs data structure and the log W elevators data structure. The RangeQuery operation can be performed in a similar fashion as the RangeQuery operation in the first family of processes 506 under the same upper bound of O(W+(number of strings to be reported)) running time.

Sort Operation

The second family of processes 508 can include the second sort module 546 to perform a sort operation via the $r^{th}$ level elevator-stairs data structure and the log W elevators data structure. The Sort operation can be performed in a similar fashion as the Sort operation in the first family of processes 506. The Sort operation implemented by the second sort module 546 can be executed within an upper bound of $$O\left(n*\left(\frac{W}{r}+\log r\right)\right)$$

running time, given a set S of n strings of length W. Sorting of a set of strings S can be achieved by:
4) Creating $D_\phi$, which is the empty dictionary;
5) Creating $D_S$ by Insert all the strings of S into $D_\phi$; and
6) Run RangeQuery(lexicographically smallest element, lexicographically largest element, $D_S$).

Step 1 has an upper bound of less than constant time; Step 2 has an upper bound of $$O\left(n*\left(\frac{W}{r}+\log r\right)\right)$$

running time; and Step 3 has an upper bound of O(n+W) running time. When n>W (which is most cases when the dictionary is scaled up for "Big Data" applications), a Sort operation can have an upper bound of $$O\left(n*\left(\frac{W}{r}+\log r\right)\right)$$

running time.

FIG. 8 is a block schematic diagram that depicts a machine in the exemplary form of a computer system 800 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance, a FPGA, an ASIC, a distributed computer system, a cloud computing system, a virtual machine, or any machine capable of executing or transmitting a sequence of instructions that specify actions to be taken. The computer system 800 is intended to illustrate a hardware device on which any of the instructions, processes, modules and components depicted in the examples of FIGS. 1-7E (and any other processes, techniques, modules and/or components described in this specification) can be implemented. As shown, the computer system 800 includes a processor 802, memory 804, non-volatile memory 806, and a network interface 808. Various common components (e.g., cache memory) are omitted for illustrative simplicity. The computer system 800 can be of any applicable known or convenient type, such as a personal computer (PC), server-class computer or mobile device (e.g., smartphone, card reader, tablet computer, etc.). The components of the computer system 800 can be coupled together via a bus and/or through any other known or convenient form of interconnect.

One of ordinary skill in the relevant art will recognize that the terms "machine-readable (storage) medium" or "computer-readable (storage) medium" include any type of device that is accessible by the processor 802. The memory 804 is coupled to the processor 802 by, for example, a bus 810. The memory 804 can include, by way of example but not limitation, random access memory (RAM), such as dynamic RAM (DRAM) and static RAM (SRAM). The memory 804 can be local, remote, or distributed.

The bus 810 also couples the processor 802 to the non-volatile memory 806 and drive unit 812. The non-volatile memory 806 may be a hard disk, a magnetic-optical disk, an optical disk, a read-only memory (ROM), such as a CD-ROM, Erasable Programmable Read-Only Memory (EPROM), or Electrically Erasable Programmable Read-Only Memory (EEPROM), a magnetic or optical card, or another form of storage for large amounts of data. The non-volatile storage 806 can be local, remote, or distributed.

The modules and/or instructions for the processes described in the disclosure may be stored in the non-volatile memory 806, the drive unit 812, or the memory 804. The processor 802 may execute one or more of the modules stored in the memory components.

The bus 810 also couples the processor 802 to the network interface device 808. The interface 808 can include one or more of a modem or network interface. A modem or network interface can be considered to be part of the computer system 800. The interface 808 can include an analog modem, ISDN modem, cable modem, token ring interface, satellite transmission interface (e.g., "direct PC"), or other interfaces for coupling a computer system to other computer systems.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the disclosure is described herein with reference to the preferred embodiment, one skilled in the art will readily appreciate that other applications may be substituted for those set forth herein without departing from the spirit and scope of the present disclosure. Accordingly, the disclosure should only be limited by the Claims included below.

What is claimed is:

1. A computer-implemented method of operating a computer system to improve scalability in updating and accessing a data dictionary of the computer system, the method comprising:
constructing, by the computer system, the record keeping dictionary by:
generating a PATRICIA trie from a set of strings on a memory;
generating multiple $k^{th}$-level elevator-stairs data structures at exponentially reducing k-levels on the memory, wherein each of the $k^{th}$-level elevator-stairs data structure includes a $k^{th}$-level trie corresponding to the PATRICIA trie, wherein a node of the $k^{th}$-level trie at a first string depth of a first integer multiple of k includes a hash table linking nodes at a second string depth at a next integer multiple of k and including a path label as a key, and wherein a k number of levels of the multiple $k^{th}$-level elevator-stairs data structures is determined based on a processor register size (r) of the computer system as compared to a maximum string length (W) of the set of strings; and
linking nodes in neighboring $k^{th}$-level tries of the multiple $k^{th}$-level elevator-stairs data structures, wherein the nodes represent a same node in the PATRICIA trie; and
corresponding, by the computer system, to an application to access the data dictionary by traversing the PATRICIA trie and one or more of the multiple $k^{th}$-level elevator-stairs data structures.

2. The method of claim 1, wherein the exponentially reducing k-levels is halved in size between each step.

3. The method of claim 1, wherein the exponentially sized elevator levels are sized from a string depth of 2 to a string depth of a maximum string length of the set of strings.

4. The method of claim 1, wherein the set of strings includes strings of binary bits.

5. The method of claim 1, wherein the maximum string length is less than or equal to the processor register size of the computer system; wherein corresponding to the application includes matching an input string from the application to a target string in the data dictionary having a longest common prefix with the input string; and wherein said matching has an upper bound of O(log W) running time.

6. The method of claim 5, wherein matching the input string to the target string having the longest common prefix with the input string includes matching prefixes of the input string at each of the $k^{th}$-level trie.

7. The method of claim 1, wherein the maximum string length is less than or equal to the processor register size of the computer system and wherein corresponding to the application includes updating the data dictionary within an upper bound of O(log W) running time.

8. The method of claim 7, wherein updating the data dictionary includes performing a longest common prefix matching operation to identify a location for said updating in the PATRICIA trie.

9. The method of claim 1, wherein the maximum string length is less than or equal to the processor register size of the computer system and wherein corresponding to the application includes searching for an input string in the data dictionary within an upper bound of O(constant) running time.

10. The method of claim 1, wherein the maximum string length is less than or equal to the processor register size of the computer system and wherein corresponding to the application includes searching for a predecessor string or a successor string of an input string in the data dictionary within an upper bound of O(W) running time.

11. The method of claim 10, wherein searching for the predecessor string or the successor string includes performing a longest common prefix matching operation to identify a location in the PATRICIA trie closest to the successor string or the predecessor string.

12. The method of claim 1, wherein the maximum string length is less than or equal to the processor register size of the computer system and wherein corresponding to the application includes identifying one or more resultant strings within a range from the data dictionary within an upper bound of O(W+number of the resultant strings within the range) running time.

13. The method of claim 12, wherein identifying the resultant strings includes identifying a lowest common ancestor between a maximum limit and a minimum limit of the range.

14. The method of claim 1, wherein the maximum string length is less than or equal to the processor register size of the computer system and wherein corresponding to the application includes identifying a sorted order of the set of strings in the data dictionary within an upper bound of O(n*log W) running time.

15. The method of claim 14, further comprising:
identifying the sorted order includes inserting the set of strings into the data dictionary; and
running a range query.

16. The method of claim 1, wherein the maximum string length is greater than the processor register size of the computer system and wherein the multiple $k^{th}$-level elevator-stairs data structures are sized based on the processor register size with a first $k^{th}$-level trie sized at intervals of string depth of r.

17. The method of claim 16, wherein corresponding to the application includes matching an input string from the application to a target string in the data dictionary having a longest common prefix with the input string; and wherein said matching has an upper bound of $$O\left(\frac{W}{r} + \log r\right)$$

running time.

18. The method of claim 16, wherein corresponding to the application includes updating the data dictionary within an upper bound of $$O\left(\frac{W}{r} + \log r\right)$$

running time.

19. The method of claim 16, wherein corresponding to the application includes searching for an input string in the data dictionary within an upper bound of $$O\left(\frac{W}{r}\right)$$

running time.

20. The method of claim 16, wherein corresponding to the application includes identifying a sorted order of the set of strings in the data dictionary within an upper bound of $$O\left(n*\left(\frac{W}{r}+\log r\right)\right)$$

running time.

21. A computer system configured to improve scalability in updating and accessing a data dictionary, the computer system comprising:
a memory storing the data dictionary, wherein the data dictionary comprises:
a PATRICIA trie of a set of strings; and
multiple $k^{th}$-level elevator-stairs data structures at exponentially reducing k-levels, wherein each of the $k^{th}$-level elevator-stairs data structure includes a $k^{th}$-level trie corresponding to the PATRICIA trie, wherein a node of the $k^{th}$-level trie at a first string depth of a first integer multiple of k includes a hash table linking one or more nodes at a second string depth of a next integer multiple of k and including a path label as a key, and wherein a k number of levels of the multiple $k^{th}$-level elevator-stairs data structures is determined based on either a processor register size (r) of the computer system or a maximum string length (W) of the set of strings;
wherein nodes in neighboring $k^{th}$-level tries of the multiple $k^{th}$-level elevator-stairs data structures are linked whenever the nodes represent a same node in the PATRICIA trie; and
wherein the maximum string length is greater than the processor register size of the computer system and wherein the multiple $k^{th}$-level elevator-stairs data structures are sized based on the processor register size with a first $k^{th}$-level trie sized at intervals of string depth of r;
a processor configured to access the data dictionary by traversing the PATRICIA trie and one or more of the multiple $k^{th}$-level elevator-stairs data structures.

22. A computer system configured to improve scalability in updating and accessing a data dictionary, the computer system comprising:
a memory storing executable instructions, that, when executed by a processor is operable to:
generate a PATRICIA trie from a set of strings on a memory of a computer system;
generate multiple $k^{th}$-level elevator-stairs data structures at exponentially reducing k-levels on the memory, wherein each of the $k^{th}$-level elevator-stairs data structure includes a $k^{th}$-level trie corresponding to the PATRICIA trie, wherein a node of the $k^{th}$-level trie at a first string depth of a first integer multiples of k includes a hash table linking one or more nodes at a second string depth at a next integer multiple of k and including a path label as a key, and wherein a k number of levels of the multiple $k^{th}$-level elevator-stairs data structures is determined based on a processor register size (r) of the computer system as compared to a maximum string length (W) of the set of strings; and
link nodes in neighboring $k^{th}$-level tries of the multiple $k^{th}$-level elevator-stairs data structures when the nodes represent a same node in the PATRICIA trie.

* * * * *